J. F. COURSON.
DRAFT GEAR.
APPLICATION FILED NOV. 21, 1910.
990,708.
Patented Apr. 25, 1911.
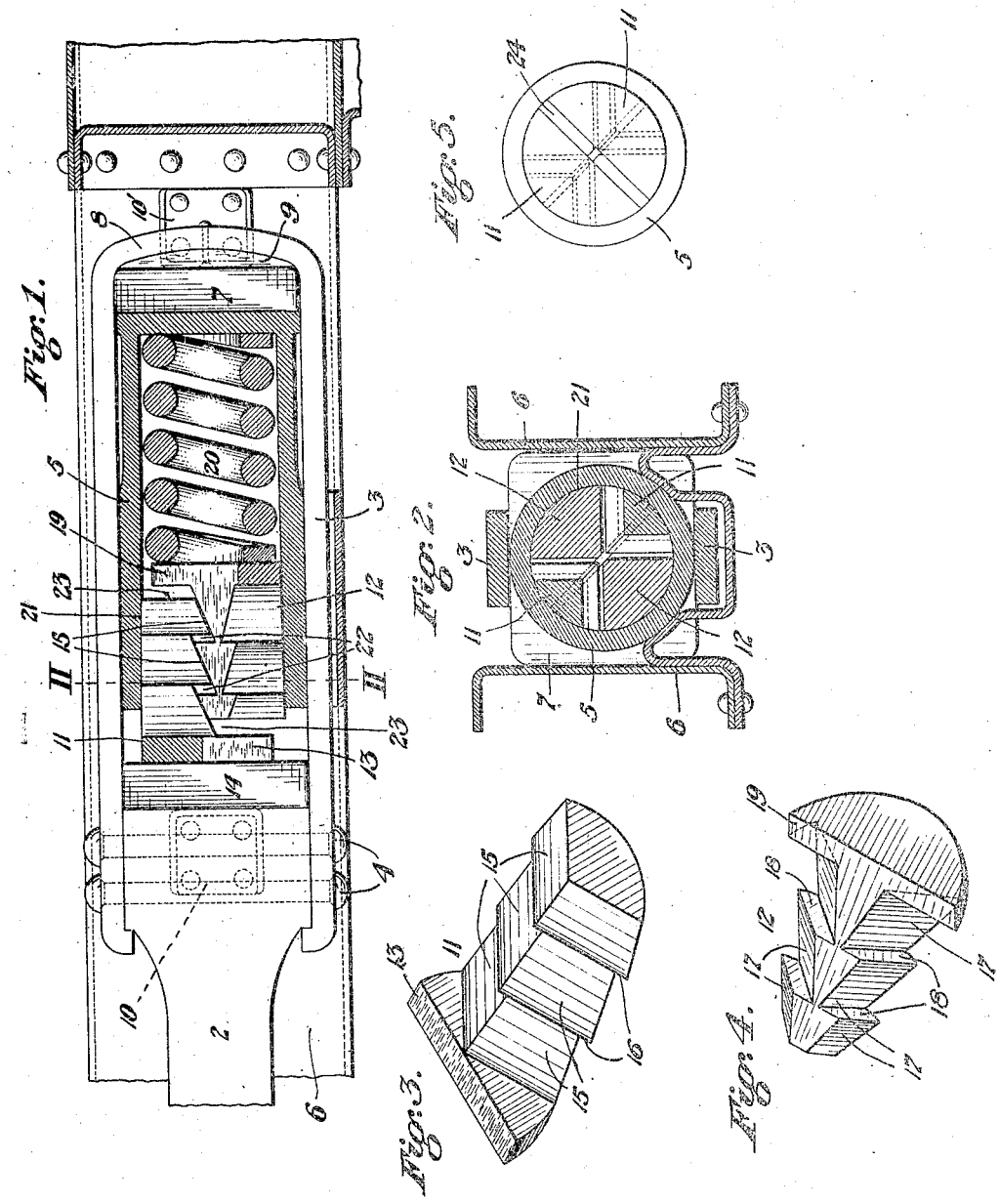

UNITED STATES PATENT OFFICE.

JOHN F. COURSON, OF PITCAIRN, PENNSYLVANIA.

DRAFT-GEAR.

990,708.    Specification of Letters Patent.    Patented Apr. 25, 1911.

Application filed November 21, 1910. Serial No. 593,459.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists of an improvement in friction draft gears for railway cars, etc., and has for its object to provide a friction draft gear of few parts and high efficiency, designed to utilize the wedging and releasing qualities of interengaging members having inner contacting wedging faces and outer friction faces with a surrounding friction cylinder, in combination with the usual draw bar and yoke, mounted and adapted to operate in the manner hereinafter more fully set forth.

In the drawings: Figure 1 is a central vertical sectional view of the complete draft gear assembled, the parts being shown in extended position. Fig. 2 is a cross sectional view on the line II. II. of Fig. 1. Fig. 3 is a detail view in perspective of one of the outer wedge faced friction shoes. Fig. 4 is a similar view of one of the inner wedge faced friction shoes. Fig. 5 is a view in elevation of the outer wedge faced friction shoes showing them in operative position within the friction cylinder.

In the drawings, 2 represents the draw bar of a coupler fixedly connected with the yoke 3 by transverse rivets 4 in the manner customary in this art, said yoke embracing the casing or cylinder 5 at top and bottom as shown, the yoke and casing being located between the center sills 6, 6. A bearing block or follower 7 is set against the rear end of cylinder 5 against the outer end of which block bears the rounded end 8 of yoke 3 with an interposed filling block 9 preferably secured to the end of the yoke.

10 are the front stops shown in dotted lines in Fig. 1, extending inwardly at each side from the center sills 6 which sustain the pulling effect of the draft gear and impart it to said sills, while similar rear stops 10′ act to receive and impart buffing strains in the same manner. The frictional resistance for opposing the buffing and pulling strains is developed within the cylinder 5 by means of sets of inter-engaging front and rear wedge blocks 11 and 12 respectively. The front wedge blocks, which in the construction shown are two in number, are provided with flanges or heads 13 which extend forwardly and bear against the front follower plate 14, which plate in turn engages the rear of draw bar 2 within the yoke 3.

The body portion of block 11 is of segmental shape in cross section, providing a plurality of pairs of tapering wedge faces 15, 15, between adjacent off-set abutments or shoulders 16 defining the terminations of the adjacent wedge faces. Wedge blocks 12, of the same number, are similarly constructed, having inclined wedge faces 17 between similar abutments or shoulders 18, and the wedge faces of each set of wedge blocks 11 and 12 respectively, correspond in number and in degree of inclination. Wedge blocks 12 are likewise provided with flanges or heads 19 which extend backwardly and bear against spring 20 within the cylinder 5, and of well known form or function. It will be observed that the terminal or endmost wedge faces 15 of blocks 11 and terminal wedge faces 17 of blocks 12, are somewhat shorter than the other wedge faces of the series, whereby to provide ample clearance between the opposing shoulders 16 and 18 when the gear is compressed, to allow for free release.

By constructing the wedge blocks 11 and 12 of segmental shape in cross section, and preferably with the angle faces 15, 15, and 17, 17, of each pair at right angles to each other, the oppositely acting blocks interfit and closely assemble, each with the other, within the cylinder 5. The interior peripheral surface 21 of the cylinder is tapered inwardly from the front to a slight degree and the exterior rounded surfaces of the blocks 11 and 12, which effect the frictional resistance by contact with the cylinder, are likewise tapered to the same slight degree. The contacting angle faces 15 and 17 are of such a degree, somewhat blunt, to the longitudinal axis of the gear, that they will effect lateral separation of the opposing blocks, when closed toward each other by endwise pressure. The effect, in either buffing or pulling, is to thrust the outer blocks 11 inwardly of the cylinder and to force the surface of both blocks 11 and both blocks 12 laterally against the tapered interior of the cylinder, due to the separating action of the wedge faces. When the pressure increases sufficiently, or the outer blocks 11 have been sufficiently inserted, the inner blocks 12 will also be carried inwardly of the cylinder, with increasing frictional resistance against the walls of the cylinder. This is due in part to the separation by the wedges and in part to the taper of the cylinder and outer faces of the blocks. Due to the taper of the cylinder also, the expanding tendency of the wedge separated blocks is opposed, so that as they together advance inwardly of the cylinder the cross area of the space which they advance through is steadily diminished. The effect of this condition is that, after the rounded outer surfaces of the wedge blocks are brought into good frictional contact with the cylinder, and the blocks have been closed inwardly of each other longitudinally, there is then an opposing elongation of the assembled wedges. This is due to the final independent movement of wedge block 12 away from block 11 on account of the necessity of its further collapsing in order to advance within the diminishing cylinder. This movement, while due also to the action of the wedge faces primarily, is actually in opposition to the first movement of the blocks toward each other. There is therefore an acceleration of travel in inner blocks 12 in addition to the movement imparted by the mere binding of the wedge faces, *per se*, so that in an entire movement of the gear the component members of the assembled wedge blocks advance into the cylinder at varying speeds. It is obvious that the same relative movements occur in pulling, wherein the cylinder is drawn toward front follower plate 14 by yoke 3.

By the construction as above described, there is provided series of clearance spaces 22 between the opposing shoulders 16 and 18 and spaces 23 between the ends of blocks 11 and 12 and the head 19 and 13 respectively of said blocks. Spaces 23 admit of ample relative movement of either block toward the other, while spaces 22 allow of longitudinal separation of the blocks to effect collapsing after release of pressure. The opposing shoulders 16 and 17 also effect a longitudinal interlock whereby the wedge blocks are closely assembled in a compact unit. As shown, the adjacent heads 13 and 19 are spaced apart in normal position, as at 24, to allow of inward movement of the individual members of each pair of wedges.

The operation will be readily understood from the foregoing description.

The entire device is very simple and of few parts, and in practice it has developed a high degree of resistance.

It will be understood that the number of the wedges, the angle of their faces, and their arrangement with relation to the other parts may be changed or varied by the skilled mechanic to suit varying conditions of use, but all such changes are to be considered as within the following claims.

What I claim is:—

1. In a friction draft gear, the combination with the casing and the relatively movable draw bar; of co-acting sets of friction blocks having interior opposed contacting wedge faces and exterior friction faces engaging the interior of the casing.

2. In a friction draft gear, the combination with a casing and draw bar relatively movable one to the other, of assembled sets of co-acting pairs of friction blocks having interior opposed contacting wedge faces, and exterior friction faces engaging the interior of the casing, substantially as set forth.

3. In a friction draft gear, the combination with the casing and the relatively movable draw bar; of co-acting sets of friction blocks having interior opposed contacting wedge faces and abutments, said abutments being spaced apart, and exterior friction faces engaging the interior of the casing.

In testimony whereof I hereunto affix my signature in the presence of two witnesses.

JOHN F. COURSON.

Witnesses:
C. M. CLARKE,
CHAS. LEPLEY.